(12) United States Patent
Curello et al.

(10) Patent No.: US 9,312,550 B2
(45) Date of Patent: Apr. 12, 2016

(54) FLUIDIC COMPONENTS SUITABLE FOR FUEL CELL SYSTEMS INCLUDING PRESSURE REGULATORS AND VALVES

(71) Applicant: Intelligent Energy Limited, Leicestershire (GB)

(72) Inventors: Andrew J. Curello, Hamden, CT (US); Paul Spahr, Durham, CT (US); Kurt Rath, Herblay (FR)

(73) Assignee: Intelligent Energy Limited, Loughborough (GB)

( * ) Notice: Subject to any disclaimer, the term of this patent is extended or adjusted under 35 U.S.C. 154(b) by 372 days.

(21) Appl. No.: 13/832,528

(22) Filed: Mar. 15, 2013

(65) Prior Publication Data

US 2014/0272658 A1 Sep. 18, 2014

(51) Int. Cl.
*F16K 31/126* (2006.01)
*H01M 8/04* (2006.01)
*F17C 13/04* (2006.01)

(52) U.S. Cl.
CPC ........... *H01M 8/04104* (2013.01); *F17C 13/04* (2013.01); *Y02E 60/50* (2013.01)

(58) Field of Classification Search
CPC .... H01M 8/04104; F17C 13/04; Y02E 60/50; Y10T 137/1819; Y10T 137/7793; Y10T 137/7809; Y10T 137/2622
USPC ............ 137/75, 505, 505.22, 505.36, 115.16, 137/613, 511; 251/335.2
See application file for complete search history.

(56) References Cited

U.S. PATENT DOCUMENTS

| | | | |
|---|---|---|---|
| 1,132,424 A * | 3/1915 | Arcus ................ | G05D 16/0636 137/505.18 |
| 2,183,569 A | 12/1939 | Hughes | |
| 3,528,455 A * | 9/1970 | Kreuter ..................... | F15C 3/00 137/625.65 |
| 3,590,860 A | 7/1971 | Stenner | |
| 3,650,181 A * | 3/1972 | Parr .......................... | F15C 3/04 92/48 |
| 3,911,947 A | 10/1975 | Boxall | |
| 3,971,398 A | 7/1976 | Taylor et al. | |
| 4,205,644 A | 6/1980 | Treadwell et al. | |
| 4,452,242 A * | 6/1984 | Banziger ............... | A61M 16/00 128/204.24 |

(Continued)

OTHER PUBLICATIONS

International Search Report and Written Opinion issued in connection with the PCT/US2008/052809 on Sep. 2, 2008.

*Primary Examiner* — Mary McManmon
*Assistant Examiner* — Minh Le
(74) *Attorney, Agent, or Firm* — Baker & Hostetler LLP

(57) ABSTRACT

The present invention is directed to devices for controlling the fluid flow and pressure, including adjustable pressure regulators, pressure regulators with an inlet restrictor, semi-automatic valve and pressure regulator with a by-pass valve. The adjustable pressure regulators have a movable shuttle, shuttle housing, a high pressure diaphragm, a low pressure diaphragm and a fluidic conduit connecting the inlet to the outlet. One or more of these components are adjusted to modify the outlet pressure of the regulator. The inlet restrictor allows incoming fluid to enter the pressure regulators when the pressure of the incoming fluid is higher than a threshold level. The positioning the inlet restrictor can be used to prevent a partial vacuum from forming inside a pressure regulator. The semi-automatic valve is opened manually but closes automatically when fluid flowing through the valve is insufficient to keep the valve open. The semi-automatic valve can also be a semi-automatic electrical switch. The by-pass valve directs the flow to bypass the pressure regulator, when the flow is slow or has low pressure.

14 Claims, 11 Drawing Sheets

(56) References Cited

U.S. PATENT DOCUMENTS

| | | | |
|---|---|---|---|
| 4,469,124 A | 9/1984 | Bronsky et al. | |
| 4,543,935 A | 10/1985 | Tuckey | |
| 4,922,955 A * | 5/1990 | Uri | F16K 15/144 137/494 |
| 5,161,775 A * | 11/1992 | Miller | F16K 31/128 251/30.05 |
| 5,336,166 A * | 8/1994 | Sierra | A61M 27/006 137/498 |
| 5,755,425 A | 5/1998 | Marolda | |
| 5,964,089 A | 10/1999 | Murphy et al. | |
| 6,257,275 B1 * | 7/2001 | Furbish | B63C 11/2209 137/505 |
| 6,273,117 B1 | 8/2001 | McPhee | |
| 6,363,964 B1 | 4/2002 | Carroll | |
| 6,544,400 B2 | 4/2003 | Hockaday et al. | |
| 6,718,998 B2 | 4/2004 | Gagnon | |
| 6,948,520 B2 | 9/2005 | Carroll | |
| 6,959,725 B2 * | 11/2005 | Yoshino | G05D 16/065 137/505.25 |
| 7,007,714 B2 | 3/2006 | Carroll | |
| 7,051,755 B2 | 5/2006 | Zuck | |
| 7,059,327 B2 * | 6/2006 | Worthington | A61F 2/20 128/200.26 |
| 7,578,310 B2 | 8/2009 | Teliscszuk et al. | |
| 7,776,487 B2 | 8/2010 | Tanaka et al. | |
| 8,002,853 B2 | 8/2011 | Curello et al. | |
| 8,082,948 B2 | 12/2011 | Curello et al. | |
| 8,256,740 B2 * | 9/2012 | Nakakubo | F16L 37/38 251/149.9 |
| 2004/0224200 A1 | 11/2004 | Ichikawa et al. | |
| 2005/0263189 A1 | 12/2005 | Nakamura | |
| 2005/0266281 A1 | 12/2005 | Adams et al. | |
| 2006/0071088 A1 | 4/2006 | Adams et al. | |
| 2006/0251935 A1 | 11/2006 | Barrett et al. | |
| 2008/0173084 A1 * | 7/2008 | Wiesinger | F02M 37/0029 73/199 |
| 2008/0202921 A1 | 8/2008 | Wilkinson et al. | |
| 2009/0014077 A1 * | 1/2009 | Kuhnle | F16K 7/17 137/625.27 |
| 2010/0104481 A1 | 4/2010 | Curello et al. | |
| 2011/0036433 A1 | 2/2011 | Spahr | |
| 2011/0189574 A1 | 8/2011 | Curello et al. | |
| 2011/0212374 A1 | 9/2011 | Rosenzweig et al. | |
| 2011/0240159 A1 | 10/2011 | Curello et al. | |
| 2012/0138172 A1 * | 6/2012 | Curello | H01M 8/065 137/511 |
| 2012/0247585 A1 * | 10/2012 | Miura | G05D 16/0655 137/505.36 |
| 2013/0048108 A1 * | 2/2013 | Carmody | G05D 16/185 137/505 |
| 2013/0074956 A1 * | 3/2013 | Okitsu | G05D 16/163 137/505 |
| 2013/0263931 A1 * | 10/2013 | Frahm, II | F16K 17/28 137/12 |
| 2014/0209178 A1 * | 7/2014 | Larsen | G05D 7/0133 137/10 |

* cited by examiner

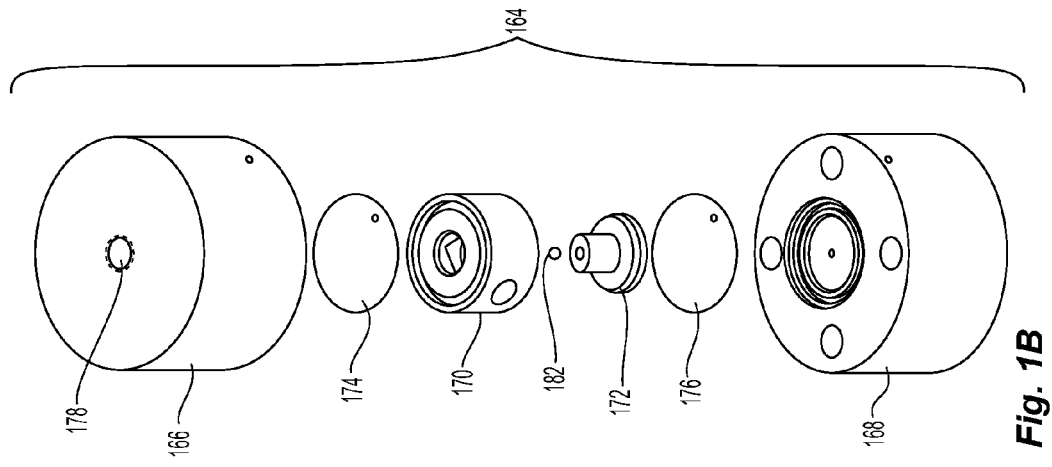
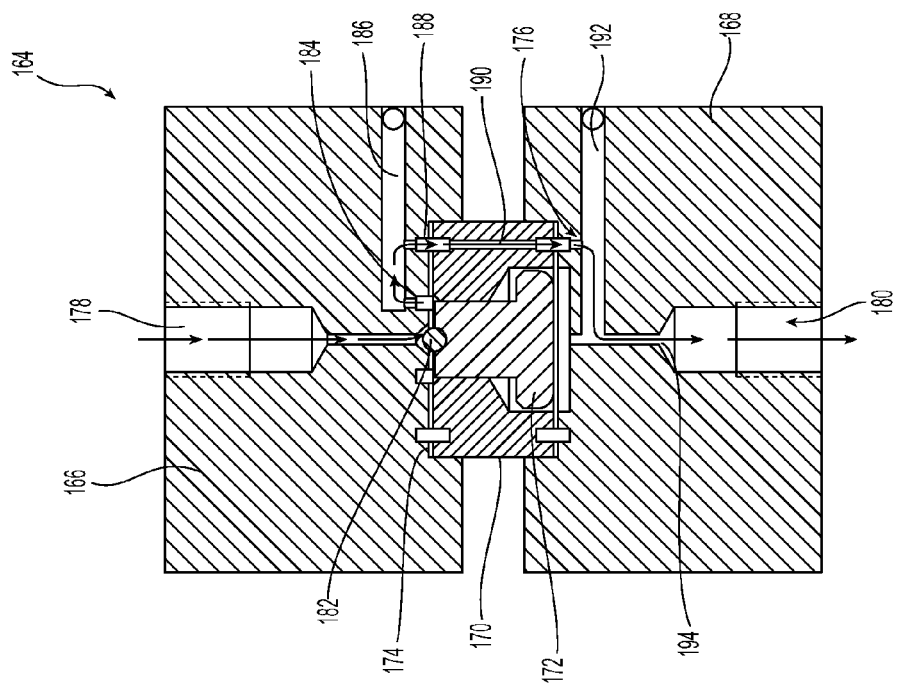

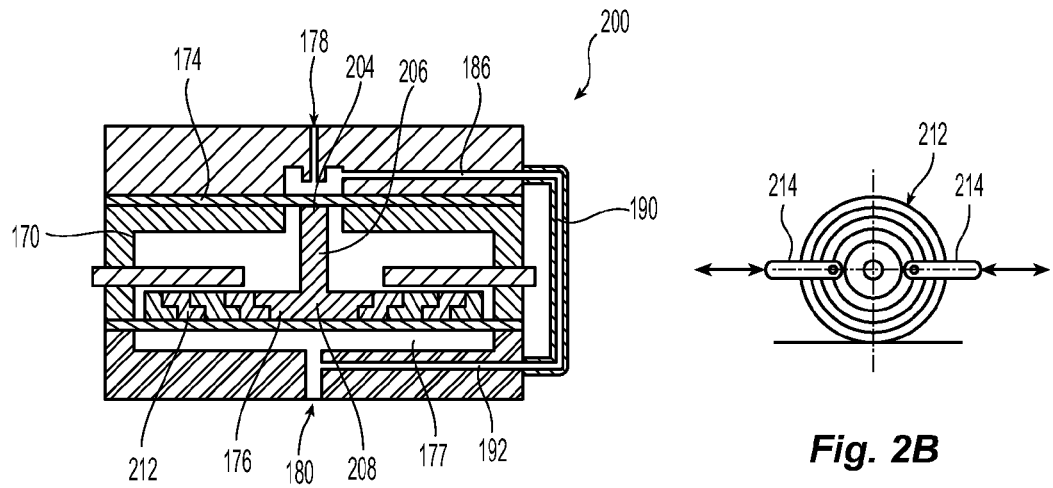
*Fig. 2A*
*Fig. 2B*
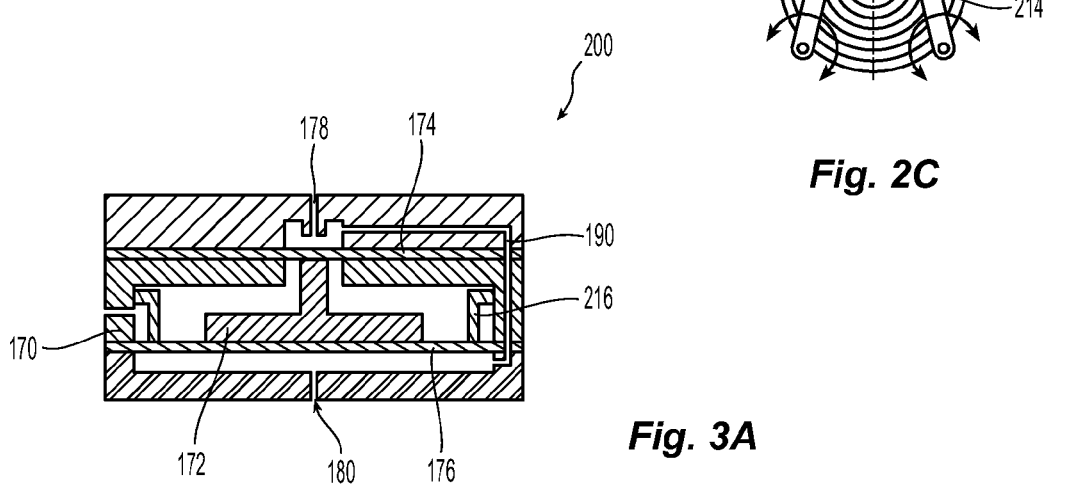
*Fig. 2C*
*Fig. 3A*
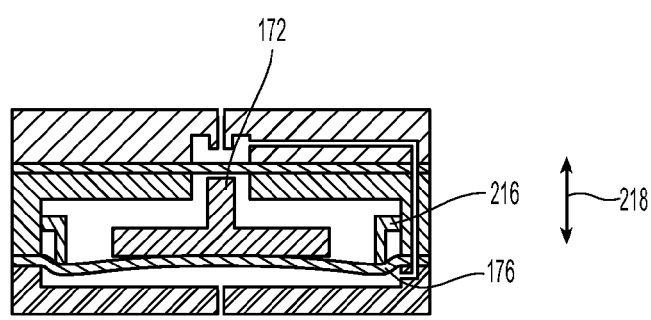
*Fig. 3B*

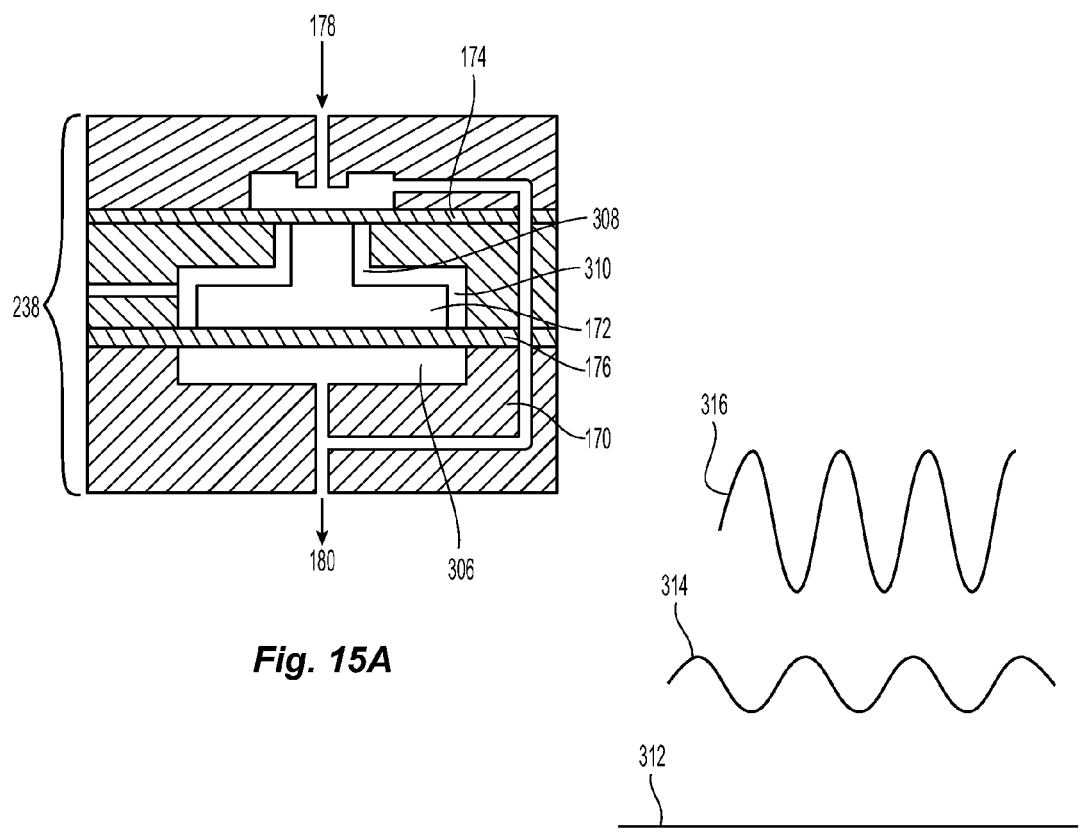
*Fig. 15A*
*Fig. 15B*
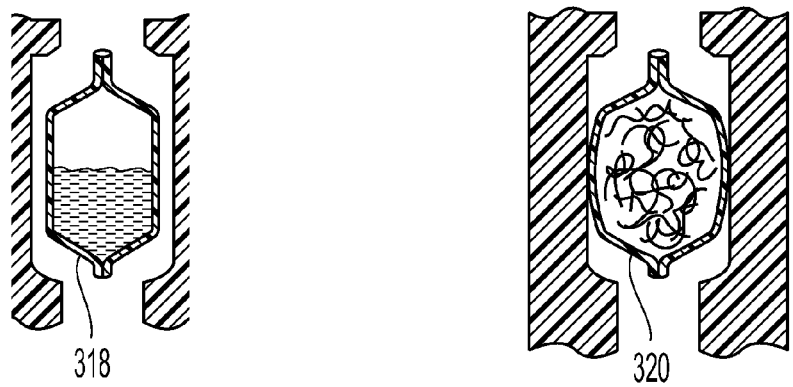
*Fig. 15C*

FLUIDIC COMPONENTS SUITABLE FOR FUEL CELL SYSTEMS INCLUDING PRESSURE REGULATORS AND VALVES

FIELD OF THE INVENTION

This invention generally relates to fluidic components that connect fuel cartridges to various fuel cell systems and fuel refilling devices. Particularly, this invention relates to pressure regulators that take fuel at a relatively high pressure from the fuel cartridges and regulate the output pressure to levels that are acceptable to fuel cells and fuel refilling devices. More specifically, the present invention relates to adjustable pressure regulators and pressure regulators with an inlet restrictor or with a by-pass and semi-automatic valves, among others.

BACKGROUND OF THE INVENTION

Fuel cells are devices that directly convert chemical energy of reactants, i.e., fuel and oxidant, into direct current (DC) electricity. In general, fuel cell technology includes a variety of different fuel cells, such as alkali fuel cells, polymer electrolyte fuel cells, phosphoric acid fuel cells, molten carbonate fuel cells, solid oxide fuel cells and enzyme fuel cells. Fuel cells generally run on hydrogen ($H_2$) fuel, and they can also consume non pure hydrogen fuel. Non pure hydrogen fuel cells include direct oxidation fuel cells, such as direct methanol fuel cells (DMFC), which use methanol, or solid oxide fuel cells (SOFC), which use hydrocarbon at high temperature. Hydrogen fuel can be stored in compressed form or within compounds such as alcohols or hydrocarbons or other hydrogen containing materials that can be reformed or converted into hydrogen fuel and byproducts. Hydrogen can also be stored in chemical hydrides, such as sodium borohydride ($NaBH_4$), that react with water or an alcohol to produce hydrogen and byproducts. Hydrogen can also be adsorbed or absorbed in metal hydrides, such as lanthanum pentanickel ($LaNi_5$) at a first pressure and temperature and released to fuel a fuel cell at a second pressure and temperature.

Most hydrogen fuel cells have a proton exchange membrane or polymer electrolyte membrane (PEM), which allows the hydrogen's protons to pass through but forces the electrons to pass through an external circuit, which advantageously can be a cell phone, a personal digital assistant (PDA), a computer, a power tool or any device that uses electron flow or electrical current. The fuel cell reaction can be represented as follows:

Half-reaction at the anode of the fuel cell:

$$H_2 \rightarrow 2H^+ + 2e^-$$

Half-reaction at the cathode of the fuel cell:

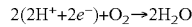
$$2(2H^+ + 2e^-) + O_2 \rightarrow 2H_2O$$

Generally, the PEM is made from a polymer, such as Nafion® available from DuPont, which is a perfluorinated sulfonic acid polymer having a thickness in the range of about 0.05 mm to about 0.50 mm, or other suitable membranes. The anode is typically made from a Teflonized carbon paper support with a thin layer of catalyst, such as platinum-ruthenium, deposited thereon. The cathode is typically a gas diffusion electrode in which platinum particles are bonded to one side of the membrane.

For DMFC, the chemical-electrical reaction at each electrode and the overall reaction for a direct methanol fuel cell are described as follows:

Half-reaction at the anode:

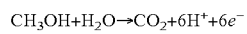
$$CH_3OH + H_2O \rightarrow CO_2 + 6H^+ + 6e^-$$

Half-reaction at the cathode:

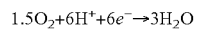
$$1.5O_2 + 6H^+ + 6e^- \rightarrow 3H_2O$$

The overall fuel cell reaction:

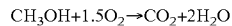
$$CH_3OH + 1.5O_2 \rightarrow CO_2 + 2H_2O$$

DMFCs are discussed in U.S. Pat. Nos. 4,390,603 and 4,828,941, which are incorporated by reference herein in their entireties.

In a chemical metal hydride fuel cell, potassium or sodium borohydride is reformed and reacts as follows:

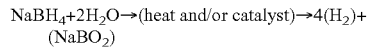
$$NaBH_4 + 2H_2O \rightarrow (\text{heat and/or catalyst}) \rightarrow 4(H_2) + (NaBO_2)$$

Suitable catalysts for this reaction include platinum and ruthenium, and other metals. The hydrogen fuel produced from reforming sodium borohydride is reacted in the fuel cell with an oxidant, such as $O_2$, to create electricity (or a flow of electrons) and water by-product, illustrated above. Sodium borate ($NaBO_2$) by-product is also produced by the reforming process. A sodium borohydride fuel cell is discussed in U.S. Pat. No. 4,261,956, which is incorporated by reference herein in its entirety.

Pressure regulators and other fluidic flow control devices are needed to control or regulate the flow of fuel from fuel cartridges or fuel storages to fuel cell systems, fuel refilling devices and the devices that fuel cells powered. The known art discloses various pressure regulators and flow control devices. A need, however, exists for improved pressure regulators and flow control devices. To a certain extent, this need has been addressed by commonly owned U.S. Pat. No. 8,002,853 and its progenies, U.S. published patent application nos. 2010/0104481, 2011/0189574 and 2011/0212374. These patent documents are incorporated herein by reference in their entireties.

SUMMARY OF THE INVENTION

The present invention is directed to adjustable pressure regulators comprising a movable shuttle, shuttle housing, a high pressure diaphragm, a low pressure diaphragm and a fluidic conduit connecting the inlet to the outlet. One or more of these components are adjusted to modify the outlet pressure of the regulator.

The present invention is also directed to pressure regulators with an inlet restrictor that allows incoming fluid to enter the pressure regulators when the pressure of the incoming fluid is higher than a threshold level. The present invention is also directed to positioning the inlet restrictor at another location to prevent a partial vacuum from forming inside a pressure regulator.

The present invention is further directed to a semi-automatic valve that is opened manually but closes automatically when fluid flowing through the valve is insufficient to keep the valve open. The inventive semi-automatic valve can also be a semi-automatic electrical switch.

The present invention is further directed to a pressure regulator with a by-pass valve, which directs the flow to bypass the pressure regulator, when the flow is slow or has low pressure.

BRIEF DESCRIPTION OF THE DRAWINGS

In the accompanying drawings, which form a part of the specification and are to be read in conjunction therewith and in which like reference numerals are used to indicate like parts in the various views:

FIG. 1A is a cross-sectional view and FIG. 1B is an exploded view illustrating the operating principles of a conventional pressure regulator shown and described in US 2010/0104481;

FIG. 2A is a cross-sectional view and FIGS. 2b-2C are top views of an adjustable pressure regulator of the present invention;

FIGS. 3A-3B are cross-sectional view of another adjustable pressure regulator of the present invention;

FIGS. 15A-15C illustrate a pressure regulator with a temperature shut-off component.

DETAILED DESCRIPTION OF THE PREFERRED EMBODIMENTS

Figure 4:
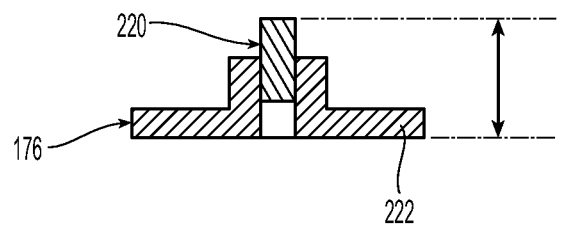
FIG. 4 is a cross-sectional view of an adjustable piston or shuttle in another adjustable pressure regulator of the present invention.

As illustrated in the accompanying drawings and discussed in detail below, the present invention is directed to fluidic components and fluid flow control components that are used in fuel cell systems with fuel cells, interface systems and fuel cartridges or fuel tanks/storages. These components can also be used in or with other technologies and industries and are not limited to fuel cell systems.

Fuel cell fuels include any fuel that can be used with any fuel cells and can be solid, liquid and gaseous fuels or combinations thereof. Liquid fuels include methanol, water, methanol/water mixture, methanol/water mixtures of varying concentrations, pure methanol, and/or methyl clathrates, ethanol or other alcohols. Solid reactive fuel cell fuels include chemical metal hydrides, such as sodium borohydrides, potassium borohydrides and other metal hydrides that react with a liquid or gel to produce hydrogen. Solid fuels can also include metal hydrides that absorb and adsorb hydrogen within the hydride's matrix at a certain temperature and pressure and release hydrogen to fuel the fuel cells at another temperature and pressure. Suitable metal hydrides, including but not limited to lanthanum pentanickel ($LaNi_5$) and the metal hydrides disclosed in U.S. Pat. Appl. Pub. No. US 2009/0060833, which is incorporated herein by reference in its entirety.

Fuels can further include hydrocarbon fuels, which include, but are not limited to, butane, kerosene, alcohol, and natural gas, as set forth in U.S. Pat. Appl. Pub. No. US 2003/0096150, entitled "Liquid Hereto-Interface Fuel Cell Device," published on May 22, 2003, which is incorporated by reference herein in its entirety. Fuels can also include liquid oxidants that react with fuels and liquid electrolyte. The present invention is therefore not limited to any type of fuels, activators, electrolytic solutions, oxidant solutions or liquids or solids contained in the supply or otherwise used by the fuel cell system. The term "fuel" as used herein includes all fuels that can be reacted in fuel cells or stored in the fuel supply, and includes, but is not limited to, all of the above suitable fuels, electrolytic solutions, oxidant solutions, gaseous, liquids, solids, and/or chemicals including additives and catalysts and mixtures thereof.

Conventional fluidic control components such as conventional pressure regulators are described in a plurality of sources. One example of pressure regulators, discussed as FIGS. 18A-B in commonly owned US 2010/0104481 previously incorporated by reference in its entirety above, is illustrated in FIGS. 1A-1B to discuss the principles of operations of pressure regulators.

One application for such a pressure regulator is to reduce the pressure of the hydrogen exiting a hydrogen storage or a hydrogen generator. Such a regulator can be positioned downstream or upstream of a shut-off valve of a hydrogen storage or generator, and can be positioned adjacent therewith. An exemplary pressure regulator 164 is illustrated in FIGS. 1A-1B. Regulator 164 comprises inlet housing 166, outlet housing 168 and retainer 170 disposed therebetween. Movably disposed within retainer or shuttle housing 170 is shuttle 172. A first diaphragm 174 is clamped between inlet housing 166 and shuttle housing 170 and a second diaphragm 176 is clamped between outlet housing 168 and shuttle housing 170. Inlet housing 166 defines inlet channel 178 and outlet housing 168 defines outlet channel 180. The interior of retainer or shuttle housing 170, where shuttle 172 is housed, can be and is preferably exposed to a reference pressure, which may be atmospheric pressure. An optional ball 182 can be provided below first diaphragm 174 directly below inlet channel 178 to help seal the inlet channel. Ball 182 can be used with any of the pressure regulators described herein. As shown, first diaphragm 174 is exposed to the inlet pressure and second diaphragm 176 is exposed to the outlet pressure. Shuttle housing 170 is preferably in fluid communication with a reference pressure, $P_{ref}$, such as atmospheric pressure.

Since the applied forces on shuttle 172 are the products of the applied pressure times the area exposed to that pressure, the forces acting on shuttle 172 can be summarized as follows:

The inlet diaphragm forces are:

$$\text{Inlet pressure·inlet area} = \text{reference pressure·inlet area} + \text{shuttle force (upper surface)} \quad [\text{Eq. 1}]$$

The outlet diaphragm forces are:

$$\text{Outlet pressure·outlet area} = \text{reference pressure·outlet area} + \text{shuttle force (lower surface)} \quad [\text{Eq. 2}]$$

Since the force on the upper surface equals the force on the lower surface, the shuttle force is the same in both equations. Solving both equations for shuttle force and equating them:

$$(\text{Inlet }P - \text{reference }P)\cdot\text{inlet area} = (\text{outlet }P - \text{reference }P)\cdot\text{outlet area} \quad [\text{Eq. 3}]$$

This equation can be rewritten to:

$$(\text{Outlet }P - \text{reference }P) = (\text{Inlet }P - \text{reference }P)\cdot\text{inlet area/outlet area} \quad [\text{Eq. 4}]$$

For the case where the reference pressure is 0 psi relative or 1 atmosphere:

$$\text{Outlet } P = \text{Inlet } P \cdot \text{inlet area/outlet area} \qquad [\text{Eq. 5}]$$

For the case where the reference pressure is not 0 psi relative, both sides of the shuttle are influenced by the reference pressure relative to their respective areas. Before the outlet pressure rises enough to shut off the inlet, the inlet area is equal to the upper surface of the shuttle. After the outlet pressure rises enough to shut off the inlet the inlet area shrinks to the small inlet opening. After the inlet area decreases, it takes less pressure in the low pressure section to keep the inlet closed. This feature will reduce shuttle oscillation with slight outlet pressure drops.

When the outlet force is less than the inlet force, the inlet hydrogen pressure forces first membrane downward to open a flow path from inlet channel 178 to inner circular channel 184, which is connected to top lateral channel 186, which is connected to outer circular channel 188 and to connecting channel 190, which is connected to lower lateral channel 192 and to outlet channel 180. Advantageously, outlet channel 180 is enlarged at 194 to allow the hydrogen gas to expand and to lose some additional pressure before exiting. Outlet channel 180 is also enlarged so that regulator 164 can be fitted to the other component(s) of the fuel cell system. Lateral channels 186 and 192 are sealed by a ball as shown in FIG. 1A.

While all the structural or functional features of pressure regulator 164 may not be utilized in the embodiments described below, the principles of pressure regulators are demonstrated.

One aspect of the present invention relates to an ability to adjust the outlet pressure on demand or without having to disassemble the pressure regulator. Referring to FIG. 2A-2C, pressure regulator 200 has adjustable piston or shuttle 202 that has a fixed, smaller high pressure head 204 connected by stem 206 to variable larger low pressure head 208. Low pressure head 208 comprises a center portion 210 and a plurality of concentric rings $212_n$. As shown in FIG. 2A, concentric rings have a reverse Z-shape in cross-section and are positioned on the second or low pressure diaphragm 176. Within shuttle housing 170, which is preferably exposed to a reference pressure such as atmospheric pressure, at least one retractable adjustment arm 214 is positioned. Arm 214 is positioned directly above concentric rings 212 to prevent the rings from moving along with low pressure diaphragm 176. As specifically shown in FIG. 2A, arms 214 would prevent all the rings from moving with low pressure diaphragm 176. As shown in Equation 5 above, the outlet pressure is proportional to the ratio of the area of the high pressure head 204 and the area of the center portion 208 of the low pressure head 208. Arms 214 can be linearly retractable, as shown in FIG. 2B, pivotally retractable, as shown in FIG. 2C. Arm 214 can be a shutter similar to those used in cameras.

One of ordinary skill in the art would readily recognize that as arms 214 retract more concentric rings 214 become movable with the shuttle 202 to enlarge the effective area of the outlet to lower the outlet pressure. Moving arms 214 in the opposite direction, i.e., into the shuttle housing 170 would have the opposite effect. Moving arms 214 preferably partially extend outside of shuttle housing 170 so that a user has access to them to adjust the pressure regulator. The reverse Z-shape of concentric rings 214 is selected to ensure that center portion 208 and unobstructed ring(s) 214 can freely move, while ring(s) 214 that are obstructed by arms 214 are held relatively stationary between obstructing arms 214 and low pressure diaphragm 176. Other shapes, such as reverse S-shape, upside down truncated conical shape can be used.

FIGS. 3A and 3B illustrate another embodiment of the inventive variable pressure regulator. In this embodiment, pressure regulator 200 has a variable low pressure diaphragm 176. As shown, this embodiment has fixed movable shuttle or piston 172 positioned between high pressure diaphragm 174 and low pressure diaphragm 176. Shuttle housing 170, illustrated in FIG. 3A as being exposed to a $P_{ref}$ such as atmospheric pressure, also has movable arm 216, which can selectively come into contact with low pressure diaphragm 176. When atm 216 contacts low pressure diaphragm 176, it limits the surface area of diaphragm 176 that can flex due to the outlet pressure as shown in FIG. 3B, thereby tending to raise the outlet pressure. Arm 216 can have any shape and preferably has the shape of a circular ring mounted on the inside of shuttle housing 170 and is movable in the direction of the arrow 218 shown in FIG. 3B to selectively come into contact with low pressure diaphragm 176.

In another embodiment, movable shuttle or piston 176 is adjustable as best shown in FIG. 4. Shuttle 176 has stem 220 that is re-movably attached to shuttle base 222, for example, stem 200 can be threaded or press-fitted to base 222, which has the larger outlet end of the shuttle. Stem 220 can also be fixedly attached to shuttle base 222 by adhesive after a total length of shuttle 176 has been determined. Adjusting the total length of the piston or shuttle has the effect of pre-stressing or preloading the diaphragms and the pressure regulator. In one example, when the preloading amount is higher than the outlet pressure at outlet 180 and lower than inlet 178, the outlet pressure of the pressure regulator would increase. In another example, when the preloading amount is higher than the inlet pressure, the pressure regulator would be in the shut-off position.

Figure 5A:
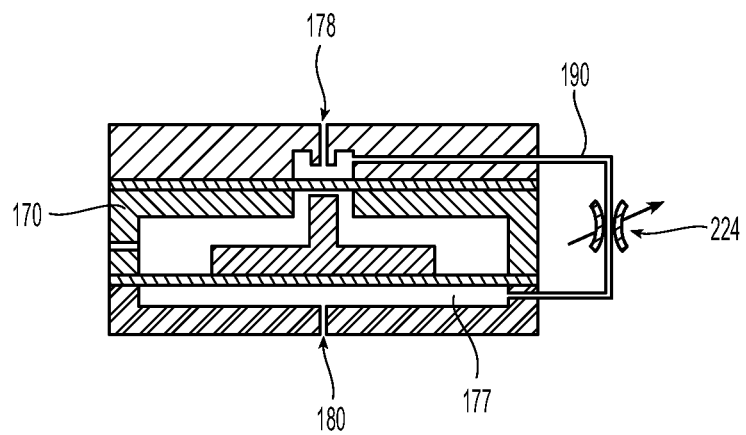
FIGS. 5A-5B are cross-sectional view of another adjustable pressure regulator of the present invention.

In another embodiment, pressure regulator 200 is adjusted by adjusting connector or connecting conduit 190 that fluidly connects the high pressure diaphragm 174 or the high pressure side to the low pressure diaphragm 176 or the low pressure side of the pressure regulator. Referring to FIG. 5A, a variable flow restrictor 224 is placed on connecting channel 190 to restrict the flow of fluid therethrough. By restricting or reducing flow through connecting channel 190, the outlet pressure would be lower, and increasing the flow through connecting channel 190 would increase the outlet pressure. Of course, when there is no or substantially no flow through pressure regulator 200, flow restrictor 224 would have no or minimal effect on the pressure regulator.

Figure 5B:
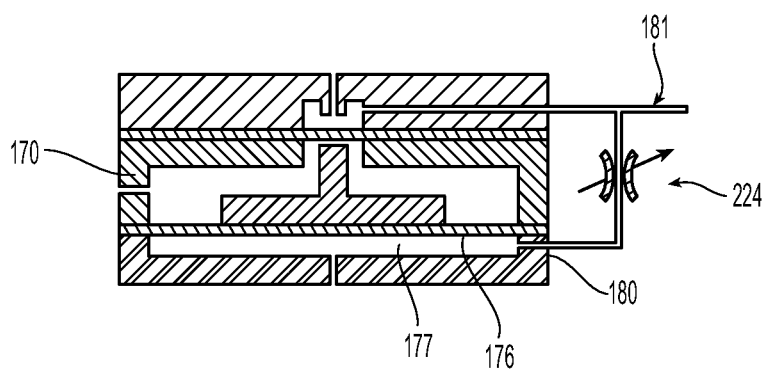

In a variation of the embodiment in FIG. 5A, the flow restrictor 224 is not located between the high pressure side and the low pressure side, but is between the outlet 180 or the low pressure side proximate to low pressure diaphragm 176 and fluid port 181 connecting the pressure regulator to a receiver or a fuel consumer such as a fuel cell, as shown in FIG. 5B. Reducing the flow would slow the shutting off of pressure regulator 200 resulting in higher dynamic flow pressure at outlet 180.

Restricting the flow reduces the speed that the shut-off pressure would reach the low pressure chamber 177 below the large low-pressure diaphragm 176. A volume of fluid or gas is present in chamber 177, and the shut-off pressure would need to propagate through chamber 177 before the entire chamber 177, as well as low-pressure diaphragm 176, reaches the necessary shut-off pressure. Reducing the flow into the chamber 177 increases the amount of time required to bring the volume of fluid or gas in the chamber to the shut-off pressure. Compared to a regulator without any flow restriction in channel 190, the pressure regulator shown in FIG. 5A will come up to pressure more slowly because the flow to the low pressure chamber 177 and the low pressure outlet are restricted.

Compared to a regulator without any flow restriction in channel 190, the pressure regulator shown in FIG. 5B will come up to pressure more quickly, because the flow to the low pressure chamber 177 is restricted, but the low pressure outlet 181 is supplied without restriction. The flow would favor the unrestricted path of outlet 181. Depending on the conditions, the outlet pressure may even overshoot until the restricted chamber 177 reaches the shut-off pressure. The outlet 181 of FIG. 5B would reach shut-off pressure faster than an unrestricted regulator that must use fluid flow to fill the low pressure chamber 177 before reaching outlet line 180. Reaching pressure quicker and overshooting the set pressure (if set up) will lead to a quicker start.

Figure 6A:
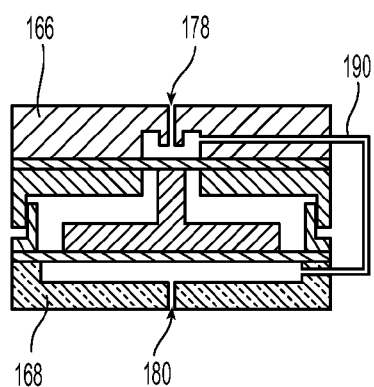
FIGS. 6A-6B are cross-sectional view of another adjustable pressure regulator of the present invention.
Figure 6B:
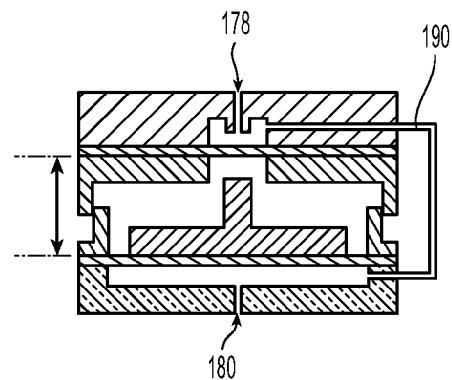

The embodiment shown in FIGS. 6A and 6B illustrates another adjusting feature of the present invention. As shown, shuttle housing 170's length is adjustable. Shuttle housing 170 comprises inlet half 166 and outlet half 168 and telescopically connected to each other, such that the length of shuttle housing 170's length is adjustable. The two halves can be connected by matching threads or held together by screws or set screws. A longer length of the shuttle housing 170 can cause a higher outlet pressure. This embodiment is similar to the embodiment shown in FIG. 4.

Figure 7A:
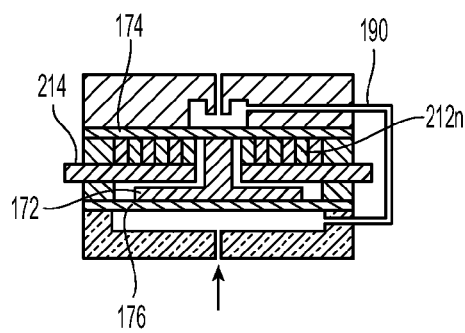
FIGS. 7A-7B are cross-sectional view of another adjustable pressure regulator of the present invention.
Figure 7B:
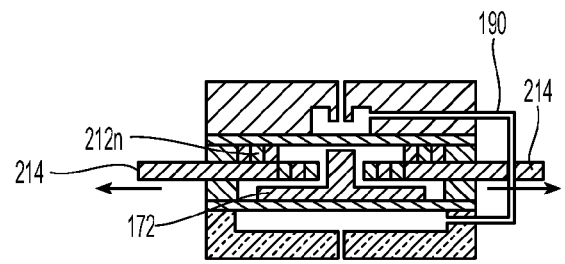

The embodiment shown in FIGS. 7A and 7B is similar to that shown in FIGS. 2A and 2B, except that the concentric rings 212n are disposed between the high pressure diaphragm 174 and retractable arms 214 to limit the amount of area of diaphragm 174 that is subject to be flexed by the high pressure from inlet 178. For example, more of diaphragm 174 shown in FIG. 7B can flex than the diaphragm shown in FIG. 7A, because fewer concentric rings 212 are available to obstruct diaphragm 174. The configuration of FIG. 7A where less of the high pressure diaphragm 174 is exposed causes a lower output pressure than the configuration in FIG. 7B where more of the high pressure diaphragm 174 is exposed.

Figure 8A:
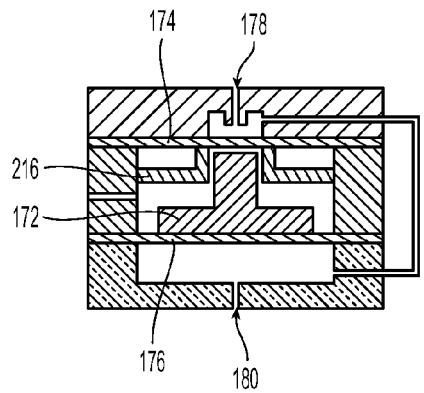
FIGS. 8A-8B are cross-sectional view of another adjustable pressure regulator of the present invention.
Figure 8B:
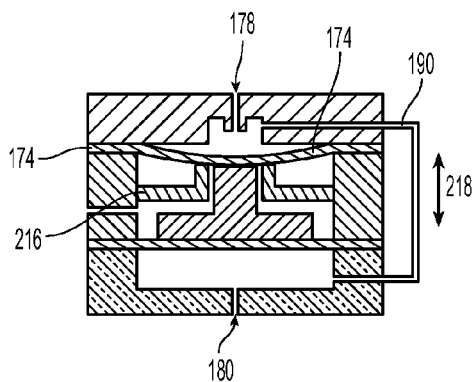

The embodiment of FIGS. 8A and 8B is similar to that of FIGS. 3A and 3B, except that movable arm 216 is selectively contacting high pressure diaphragm 174 to limit the amount of diaphragm 174 that can flex. Similarly, movable arm 216 is preferably a ring that is disposed within shuttle housing 170 and is movable in the direction 218. The effects of movable arm 216 on high pressure diaphragm 174 are similar to those described in connection with the embodiment of FIGS. 7A and 7B.

Another aspect of the present invention relates to a low pressure restrictive or cut-off device 236 for any pressure regulator 238, including pressure regulators 164 and 200 discussed herein or any known pressure regulator. Restrictive device 236 sets a minimum threshold pressure that pressure regulator 238 would function. When the inlet pressure of the incoming fluid at inlet 178 is less than this minimum threshold pressure, restrictive device 236 remains closed and the incoming fluid would not enter pressure regulator 238. When the inlet pressure is higher than the minimum threshold pressure, restrictive device 236 opens to allow the incoming fluid to enter pressure regulator 238.

Figure 9A:
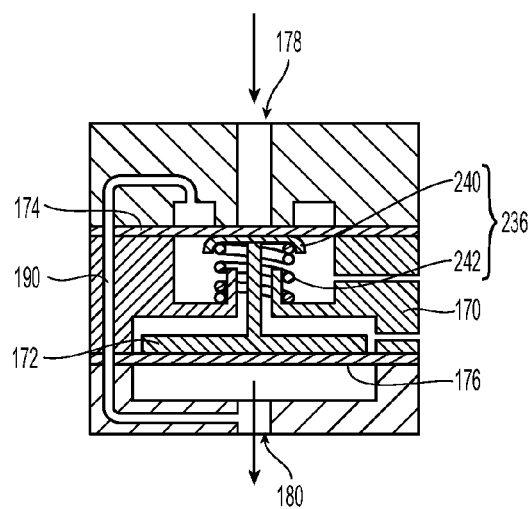
FIGS. 9A-9B are cross-sectional view of pressure regulators with an inlet restrictor of the present invention.

Referring to FIG. 9A, restrictive device 236 comprises a cap 240 biased by spring 242 against high pressure membrane 174, such that high pressure membrane 174 would not flex to allow the incoming fluid to enter the pressure regulator, until the incoming fluid can overcome restrictive device 236. More specifically, cap 240 and spring 242 of restrictive device 236 exerts a limiting pressure ($P_{lim}$) equals to the spring force exerted by spring 240 divided by the area of cap 240. This limiting pressure is applied to high pressure diaphragm 174 and inlet 178. Incoming fluid with a pressure higher than this limiting pressure would push cap 240 and spring 242 inward to enter pressure regulator 238. One advantage of the embodiment in FIG. 9A is that spring 242 and cap 240 are isolated from the fuel cell fuels, such as hydrogen, which can corrode or otherwise negatively affect these components. Although, shuttle housing 170 can be exposed to a reference pressure, as shown in FIG. 9A, shuttle housing 170 may be sealed. Any gas that is trapped in shuttle housing 170 acts like a gas spring resisting compression similar to spring 242.

Figure 9B:
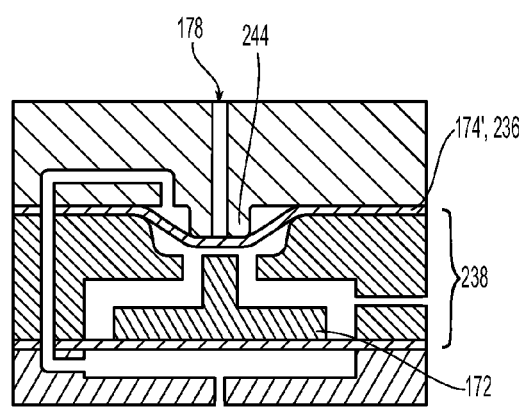

In another embodiment, restrictive device 236 comprises a pre-loaded or pre-stressed high pressure diaphragm 174' as shown in FIG. 9B, such that an inlet pressure greater than $P_{lim}$ is necessary to open pressure regulator 238. Here, $P_{lim}$ is the amount of pre-loading on high pressure diaphragm 174. The pre-loading can be any protrusion 244 that stretches diaphragm 174'.

Figure 10A:
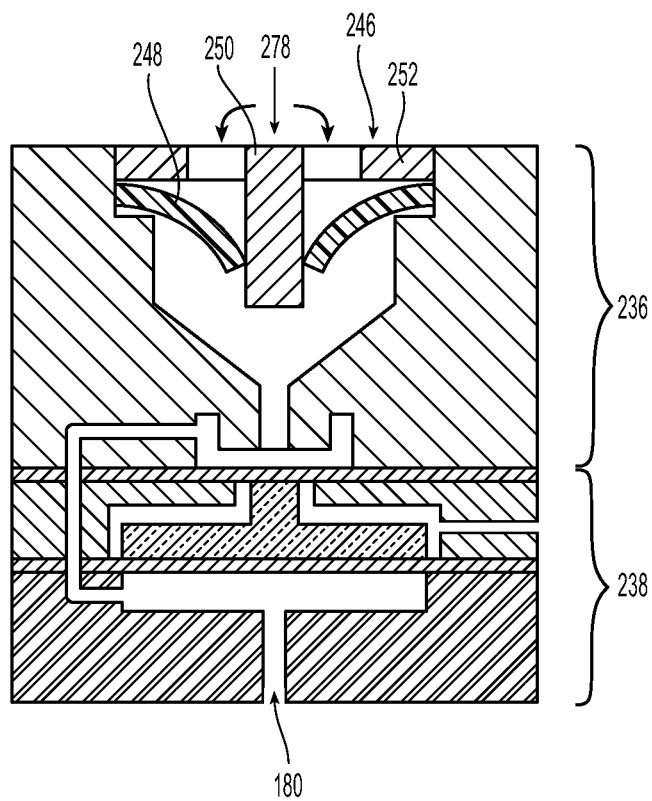
FIG. 10A is cross-sectional view of a pressure regulator with an inlet restrictor of the present invention.
Figure 10B:
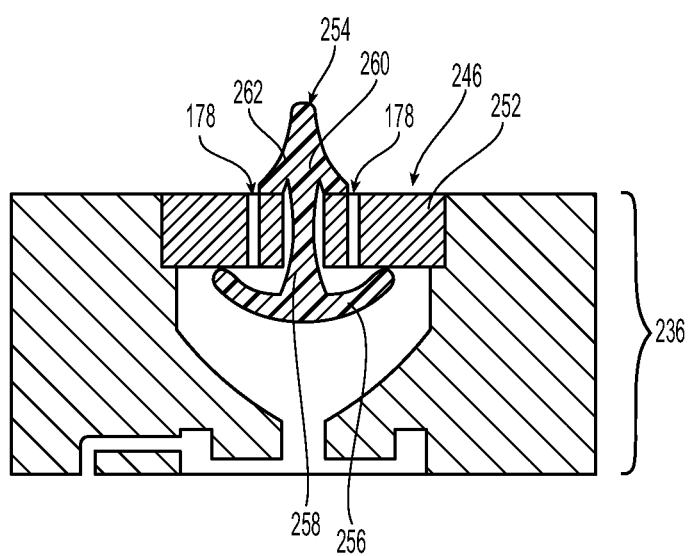
FIG. 10B is a cross-sectional view of another inlet restrictor.

FIGS. 10A and 10B illustrate another embodiment of restrictive device 236. In this embodiment, restrictive device 236 comprises a relief valve 246, or a valve 246 that opens after pressure reaches a threshold level or $P_{lim}$. Shown in FIG. 10A, valve 246 comprises an elastomeric disk 248, which is the sealing member that is biased against post 250. Post 250 is attached to base 252 that defines inlet(s) 178. Valve 246 is normally closed when the inlet pressure is below the threshold level or below $P_{lim}$. Above $P_{lim}$, sealing member 248 moves away from post 250 to allow incoming fluid to enter pressure regulator 238.

FIG. 10B shows another embodiment of valve 246. In this configuration, valve 246 comprises an elastomeric member 254 attached to base 252, which defines inlet(s) 178. Elastomeric member 254 has sealing end 256, stem 258 and anchor end 260. Anchor end 260 preferably protrudes from base 252 and has shoulder 262 to anchor member 254 to base 252. Stem 258 extends through base 252 and is connected to sealing member 256. Sealing member 256 covers inlet(s) 178 and seals against base 252 to prevent the transport of incoming fluid with pressure less than $P_{lim}$. As shown, sealing member 256 has a concave shape. The shape and thickness of sealing member 256 determines the open threshold pressure or $P_{lim}$. Alternatively, sealing member 256 can have a substantially flat shape. Valve 246 can be any valve that is designed to open at or above a threshold pressure or $P_{lim}$. Another example of valve 246 is a ball valve or poppet valve shown in FIG. 11A.

Figure 11A:
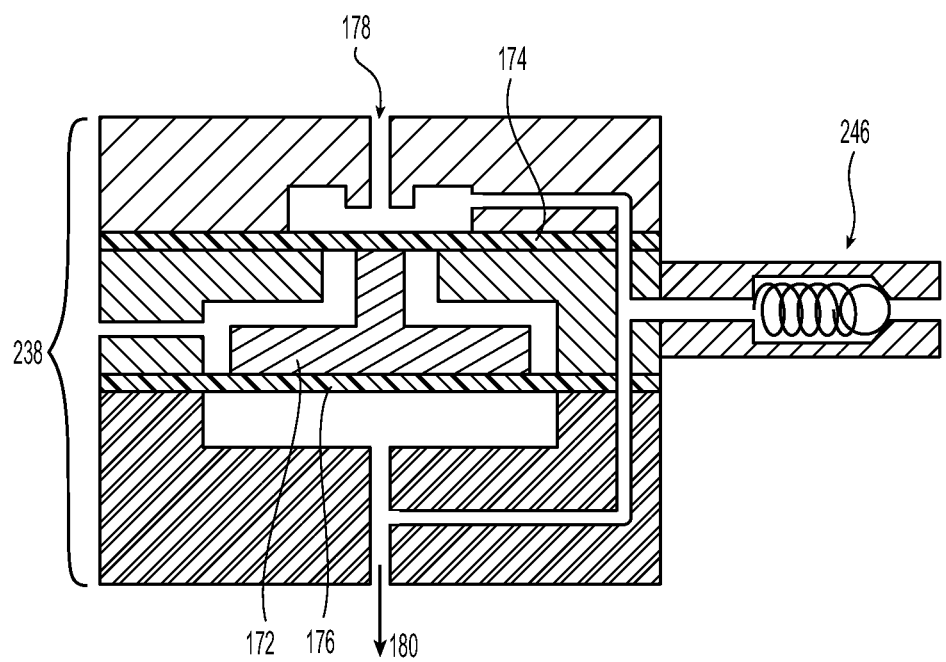
FIG. 11A is a cross-sectional view of a pressure regulator with a vent to prevent partial vacuum of the present invention.
Figure 11B:
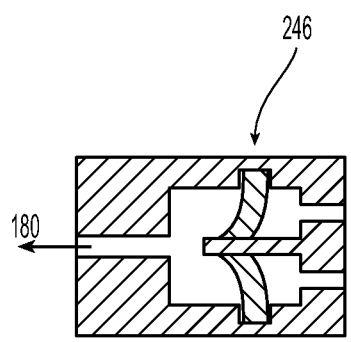
FIG. 11B is a cross-sectional view of another vent.

FIG. 11A illustrates another aspect of the present invention. Similar to FIGS. 10A and 10B, this embodiment comprises pressure regulator 238 and valve 246, which preferably is a relief valve. However, valve 246 is located downstream of high pressure diaphragm 174 and is in fluid communication with low pressure diaphragm 176 and low outlet pressure at outlet 180. Valve 246 also vents to atmosphere or another pressure source. In the event that the outlet pressure at outlet 180 or the pressure within the pressure regulator becomes a partial vacuum, i.e., having a pressure below atmospheric pressure, valve 246 opens to allow air to enter pressure regulator to break the partial vacuum. A partial vacuum may occur when a vacuum is used at inlet 178 to close the pressure regulator, and the outlet 180 is at a partial vacuum. As shown in FIG. 11B, a different valve 246, such as the one shown in FIG. 10A as well as the valve 246 shown in FIG. 10B, can also be used.

Additionally, pressure regulator 238 can resist the formation of a partial vacuum when shuttle 172 are fixedly attached to low pressure diaphragm 176 and to high pressure diaphragm 174, so that the flexibility or springiness property of both diaphragms and the mass of shuttle 172 are used to resist a partial vacuum on the low pressure side of pressure regulator 238. Shuttle 172 and diaphragms 174 and 176 move in unison, similar to those shown in FIGS. 13A-B albeit for a different fluidic device. Preferably, shuttle 172 and diaphragm 174 and 176 are permanently attached to each other or are made integral to each other.

Figure 12A:
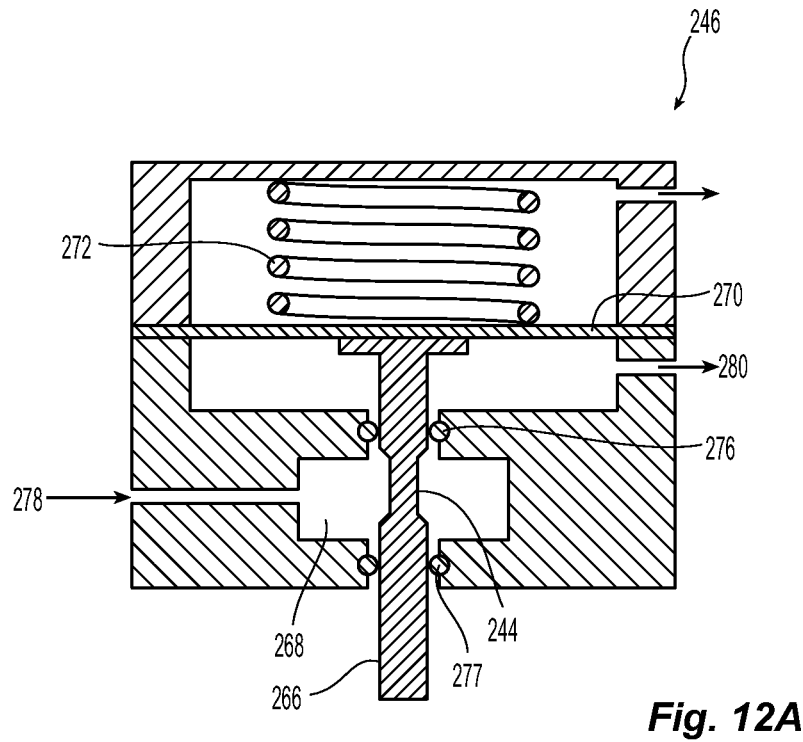
FIGS. 12A-12B are cross-sectional views of a semi-automatic valve of the present invention.
Figure 12B:
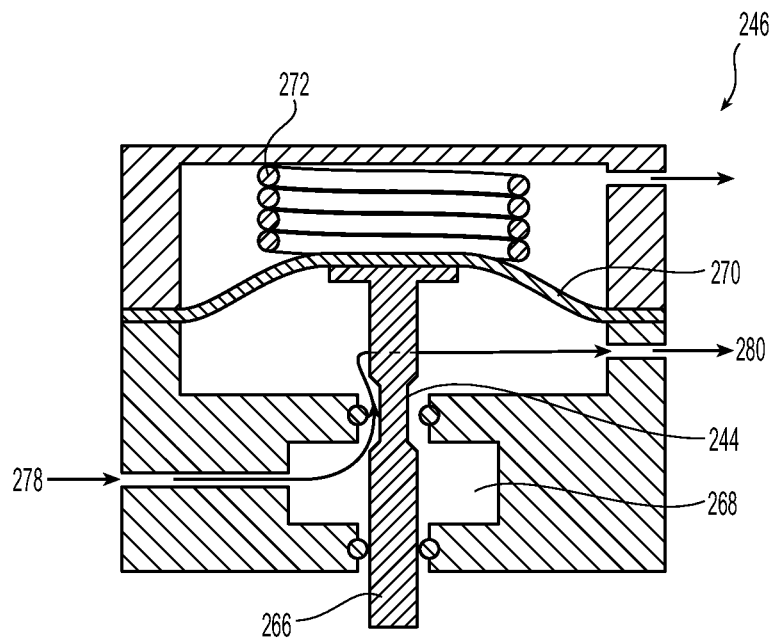

Pressure regulators can also be modified to be a valve that is opened manually but is shut-off automatically when the flow through the valve drops below a certain threshold. As shown in FIGS. 12A and 12B, semi-automatic valve 264 has shuttle 266 that traverses chamber 268 and connects to diaphragm 270 supported or biased by spring 272. Valve 264 has inlet 278 and outlet 280, and preferably the chamber that houses spring 272 is exposed to $P_{ref}$, which can be atmospheric pressure. Shuttle 266 has a reduced central portion 274 and in the closed position seals chamber 268 by sealing members 276, 277, as shown in FIG. 12A. In the closed position, incoming fluid cannot enter inlet 278 regardless of its pressure, because chamber 268 is sealed to shuttle 266, and the incoming fluid is not in fluid communication with diaphragm 270.

To open valve 264, a user pushes shuttle 266 at its free end toward diaphragm 270 until the reduced central portion 274 is located opposed to inner sealing member 276 while shuttle 266 remains sealed to outer sealing member 277. This brings chamber 268 and inlet 278 into fluid communication with outlet 280 allowing incoming fluid to flow through valve 264, as shown in FIG. 12B. As long as the flow though valve 264 remains high or above a preset or predetermined threshold level to overcome the biasing force of spring 272 and of diaphragm 270, the valve remains open. Hence, the force or pressure necessary to keep valve 264 open is determined by the biasing force of spring 272 and diaphragm 270 and the area of diaphragm 270. When the pressure of the flow through valve 264 drops below this threshold level, valve 264 automatically shuts-off due to the actions of spring 272 and diaphragm 270.

Figure 13A:
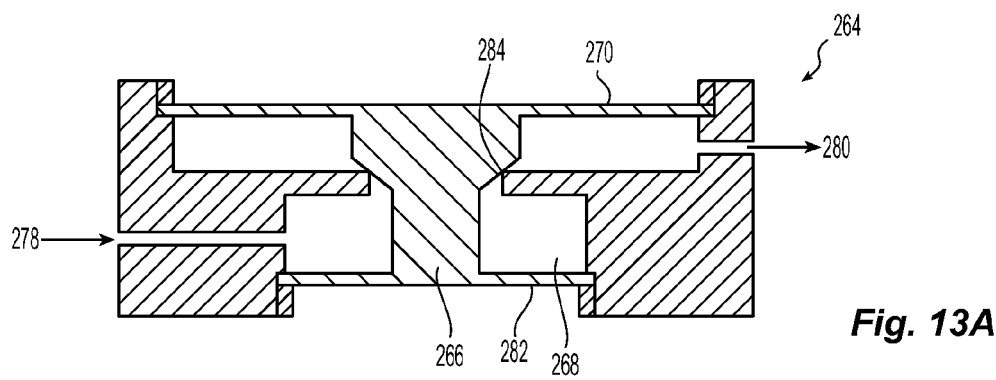
FIGS. 13A-13B are cross-sectional views of another semi-automatic valve of the present invention.
Figure 13B:
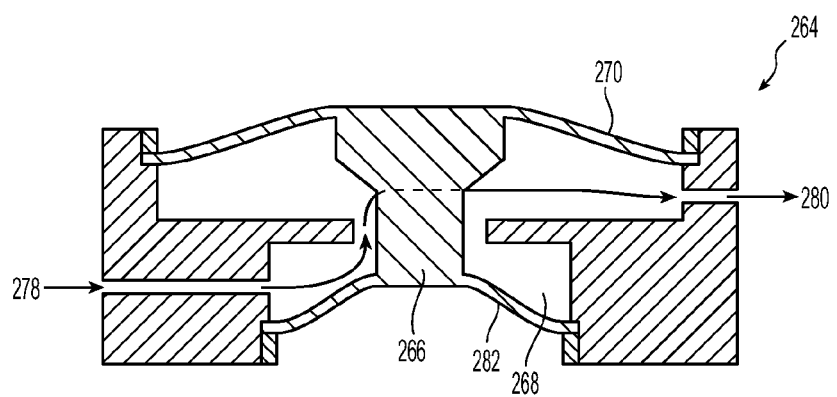

Another version of semi-automatic valve 264 is shown in FIGS. 13A-13B. In this embodiment, spring 272 is omitted and the biasing force to keep valve 264 open is provided by diaphragm 270 and optionally by second diaphragm 282. Stem 266 is also simplified. It is sealed to the body of the valve by second diaphragm 282 and seals chamber 268 by an inner sealing seat 284, as shown in FIG. 13A.

This embodiment of valve 264 operates substantially the same way as that shown in FIGS. 12A-B. The user pushes stem 266 toward diaphragm 270 allowing chamber 268 and inlet 278 to be in fluid communication with outlet 280. As long as the flow though valve 264 remains high or above a preset or predetermined threshold level to overcome the biasing force of diaphragm 270, the valve remains open. In this embodiment this threshold level is determined by the flexibility or spring-constant and area of diaphragms 270 and 282.

Figure 13C:
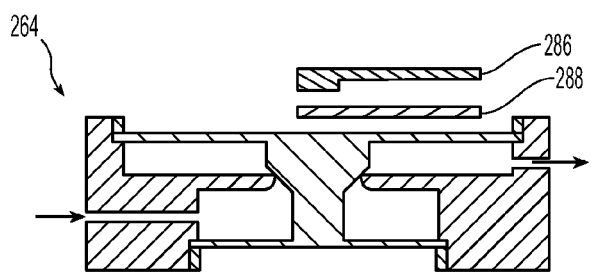
FIGS. 13C-13D are cross-sectional views of the semi-automatic valve of FIGS. 13A and 13B operatively connected to an electrical switch.
Figure 13D:
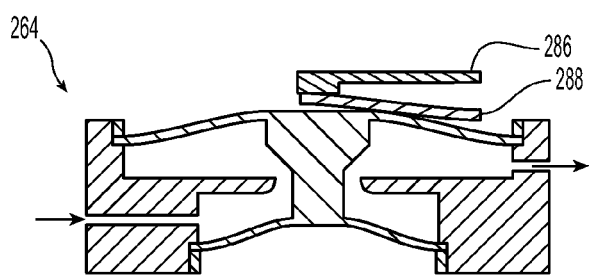

Valve 264 shown in FIGS. 13A-B can also be used as electrical switches that are manually turned on, but are automatically turned off as the flow through valve 264 decreases below the threshold level. Referring to FIGS. 13C-D, an electrical switch having terminals 286 and 288, one of which is positive and one is negative, positioned in proximity to valve 264 and more specifically to the distal end of stem 266. As shown in FIG. 13C, when valve 264 is closed, terminals 286 and 288 are not connected and the electrical circuit connected to these terminals is open and not operational. As shown in FIG. 13D, when valve 264 is open, terminals 286 and 288 are connected and the electrical circuit connected to these terminals is closed and operational. Terminals 286 and 288 can be used as a switch for a fuel cell circuit or for a circuit in an electronic device that the fuel cell powers, so that the fuel cell or the electronic device is turned off when the flow of fuel through valve 264 ceases. Terminals 286 and 288 can be biased apart by an insulated spring (not shown) or they may be cantilever beams.

Figure 14A:
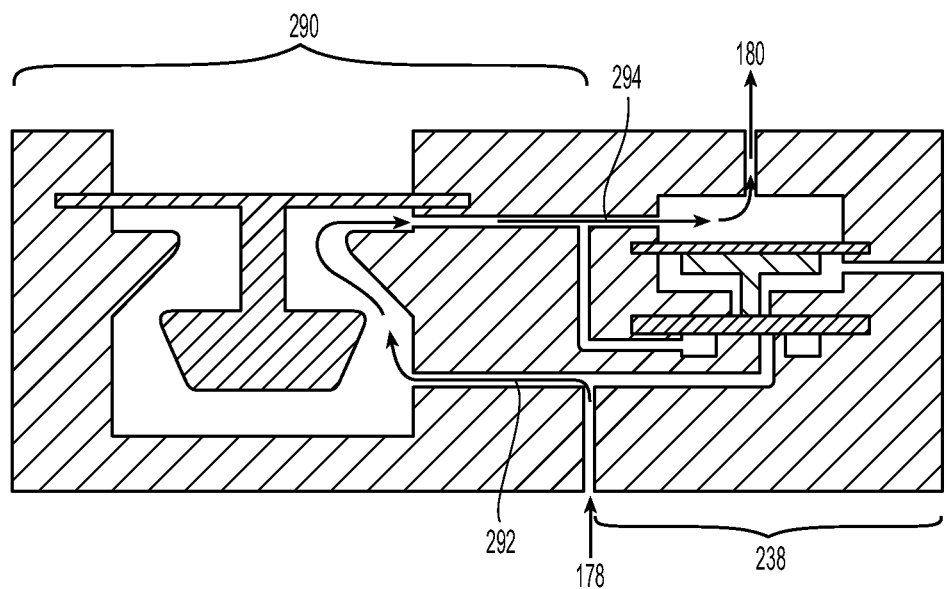
FIGS. 14A-14B are cross-sectional views of a pressure regulator with a by-pass valve of the present invention.
Figure 14B:
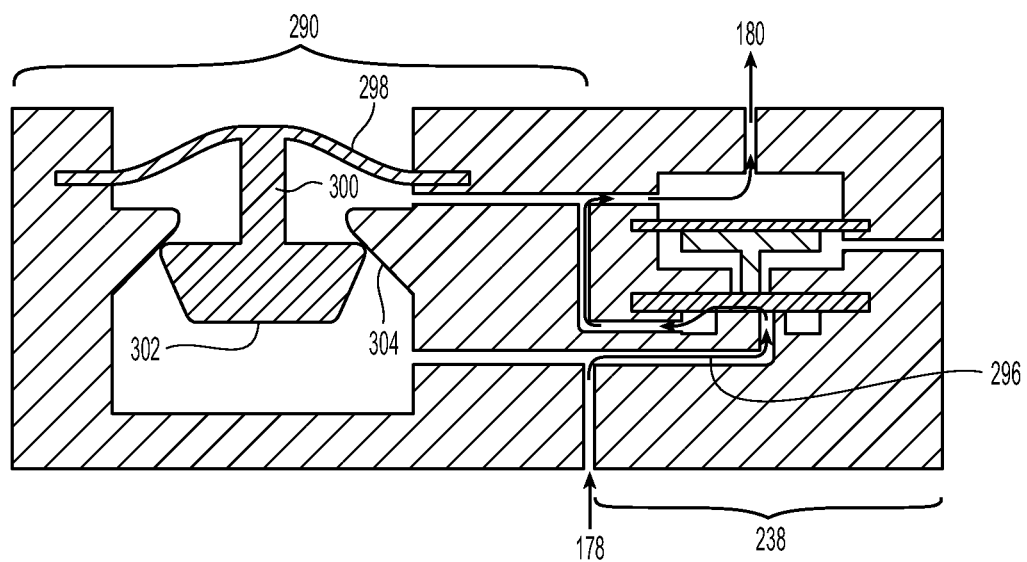

Pressure regulators, including but not limited to pressure regulator 238 which includes pressure regulators 164 and 200 discussed herein, can be used with a by-pass valve 290 as shown in FIGS. 14A and 14B. Incoming fluid enters regulator 238/by-pass valve 290 at inlet 178. When the pressure of the incoming fluid is below the "cracking" pressure of pressure regulator 238, i.e., the incoming fluid's pressure is too low to move the diaphragms and piston/shuttle of the pressure regulator to open the pressure regulator, the incoming fluid flows to by-pass conduit 292 and through by-pass valve 290 to by-pass outlet 294 and out through outlet 180, as shown in FIG. 14A.

On the other hand, when the incoming fluid's pressure is sufficiently high, such that the incoming fluid, e.g., fuel cell fuel, should be regulated to be acceptable to the fuel cell, the incoming fluid flows through regulator conduit 296 and pressure regulator 238 and exits through outlet 180. High pressure of the incoming fluid pushes diaphragm 298 which pulls valve stem 300 and valve seat 302 into a sealing position with sealing surface 304 of by-pass valve 290. By-pass valve 290 is normally open, and the threshold force that closes the valve and by-pass conduit 292 depends on the spring force and area of diaphragm 298. Countering this threshold force is the force which equals to the product of the incoming fluid's pressure times the effective bottom area of valve seat 302. When the force of the incoming fluid is less than this threshold force, valve 290 opens to allow the incoming fluid to by-pass pressure regulator 238.

In another embodiment, pressure regulator 238, which can by any pressure regulator as discussed above, can be rendered inoperative, e.g., shut-off, when the temperature of the fuel cell or the electronic device that the fuel cell powers reaches a certain level where it is desirable to shut the device or the fuel cell down. As a best shown in FIG. 15A-C, a material that changes its shape at a certain temperature can be placed within the pressure regulator so that when expanded or changed the material arrests the movements of shuttle 172 or to push shuttle 172 towards inlet 178 or outlet 180 to seal the inlet/outlet. This material can be place in area 306 between outlet 180 and low pressure diaphragm 176, or in area 308 between inlet 178 and high pressure diaphragm 174 or in area 310 between shuttle 172 and shuttle housing 170. Suitable temperature sensitive materials include but are not limited to shape memory alloy (SMA) such as nitinol, as illustrated in FIG. 15B. When relax or at lower temperature, SMA can be relatively flat, e.g., wire 312 or wire 314, and can change to a thicker wire, e.g., wire 314 or wire 316, respectively. One or more such SMA wires can be placed in areas 306, 308 or 310 to freeze or render pressure regulator 238 inoperative, at least temporarily until the temperature decreases again.

Temperature sensitive material can be an elastomeric or flexible pouch or container storing a liquid that changes from liquid to gas at certain temperature. As illustrated in FIG. 15C, container 318, which has a relatively smaller volume when containing a liquid, expands, when the temperature elevates above the boiling point of the liquid, to become larger container 320. An example of a suitable liquid is methanol which boils at about 65° C. and water which boils at about 100° C. at standard pressure. Other examples of suitable temperature expandable including wax are fully disclosed in US published patent application US 2006/0071088, which is incorporate herein by reference in its entirety.

While it is apparent that the illustrative embodiments of the invention disclosed herein fulfill the objectives stated above, it is appreciated that numerous modifications and other embodiments may be devised by those skilled in the art. Therefore, it will be understood that the appended claims are intended to cover all such modifications and embodiments, which would come within the spirit and scope of the present invention.

We claim:

1. A pressure regulator comprising
   a movable shuttle disposed between a high pressure diaphragm, a low pressure diaphragm
   a shuttle housing to house the shuttle;
   a conduit, wherein at least one of said components of the pressure regulator is adjustable to change an outlet pressure of the pressure regulator;
   a movable member connected to the shuttle housing, said movable member is moved to contact either the low pressure diaphragm or the high pressure diaphragm to determine an area of said contacted diaphragm that can flex; and,
   wherein the conduit connects an inlet to an outlet, the high pressure diaphragm is located proximate to the inlet and the low pressure diaphragm is located proximate to the outlet.

2. The pressure regulator of claim 1, wherein the shuttle comprises a high pressure end and a low pressure end and the low pressure end comprises a center portion and a plurality of concentric rings, wherein a number of rings is selected to be connected to the center portion to determine the movable area of the low pressure end.

3. The pressure regulator of claim 2 further comprises at least one movable arm connected to the shuttle housing, said at least one movable arm is moved to select the rings to be connected to the center portion.

4. The pressure regulator of claim 1, wherein the shuttle comprises a stem and a low pressure base and the stem is movable relative to the low pressure base to change a length of the shuttle.

5. The pressure regulator of claim 1 further comprising a flow restrictor connected to the conduit connecting the inlet to the outlet.

6. The pressure regulator of claim 1 further comprising a flow restrictor positioned between the outlet of the pressure regulator and a fluid port of a receiver of a fluid transporting through the pressure regulator.

7. The pressure regulator of claim 1, wherein the shuttle housing comprises a first and second half movable relative to each other to change a length of the shuttle housing.

8. The pressure regulator of claim 1 further comprising a plurality of concentric rings disposed between the high pressure diaphragm and at least one movable arm connected to the shuttle housing, said at least one movable arm is moved to select a number of rings to obstruct to determine an area of the high pressure diaphragm to flex.

9. A pressure regulator having an inlet and an outlet,
   wherein a flow restrictor is fluidly connected to the pressure regulator,
   wherein a fluid enters the inlet at an inlet pressure and exits the outlet at an outlet pressure;
   wherein the inlet pressure is higher than the outlet pressure;
   wherein the flow restrictor allows said fluid or a second fluid to pass through when the fluid's pressure is higher than the flow restrictor's threshold pressure;
   wherein the flow restrictor comprises a relief valve; and,
   wherein the flow restrictor is fluidly connecting the outlet of the pressure regulator to atmosphere and wherein the second fluid comprises air to allow air to pass through the flow restrictor to the pressure regulator to prevent a partial vacuum within the pressure regulator.

10. The pressure regulator of claim 9, wherein the flow restrictor is fluidly connected to the inlet of the pressure regulator to allow said fluid to enter the pressure regulator when said fluid's pressure exceeds the flow restrictor's threshold pressure.

11. The pressure regulator of claim 9, wherein the flow restrictor comprises a by-pass valve.

12. The pressure regulator of claim 11, wherein the by-pass valve is fluidly connected to the inlet of the pressure regulator to allow said fluid to enter the pressure regulator when said fluid's pressure exceeds the by-pass valve's threshold pressure and to allow said fluid to enter the by-pass valve when said fluid's pressure is less than the by-pass valve's threshold pressure.

13. The pressure regulator of claim 12, wherein the by-pass valve is closed when the fluid's pressure exceeds the by-pass valve's threshold pressure.

14. The pressure regulator of claim 12, wherein the by-pass valve comprises a diaphragm connected to a valve seat wherein the said fluid's pressure exceeds the by-pass valve's threshold pressure, the diaphragm moves the valve seat to a sealing position.

* * * * *